United States Patent
Shen

(10) Patent No.: US 9,240,820 B2
(45) Date of Patent: Jan. 19, 2016

(54) NETWORK COMMUNICATION STRUCTURE, NETWORK COMMUNICATION SYSTEM AND NETWORK COMMUNICATION METHOD

(75) Inventor: Sheng-Kun Shen, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 617 days.

(21) Appl. No.: 13/620,549

(22) Filed: Sep. 14, 2012

(65) Prior Publication Data

US 2013/0250852 A1 Sep. 26, 2013

(30) Foreign Application Priority Data

Mar. 22, 2012 (TW) .............................. 101109883 A

(51) Int. Cl.
| | |
|---|---|
| H04W 4/00 | (2009.01) |
| H04B 3/54 | (2006.01) |
| H04W 52/02 | (2009.01) |
| H04W 84/12 | (2009.01) |
| H04W 88/08 | (2009.01) |

(52) U.S. Cl.
CPC .............. *H04B 3/54* (2013.01); *H04W 52/0222* (2013.01); *H04B 2203/5441* (2013.01); *H04B 2203/5445* (2013.01); *H04B 2203/5479* (2013.01); *H04W 52/0245* (2013.01); *H04W 84/12* (2013.01); *H04W 88/08* (2013.01)

(58) Field of Classification Search
USPC ......... 370/229, 230, 235, 252, 311, 318, 328, 370/332, 349, 392
See application file for complete search history.

(56) References Cited

U.S. PATENT DOCUMENTS

| | | | |
|---|---|---|---|
| 6,925,069 B2 | 8/2005 | Koos, Jr. et al. | |
| 2011/0317603 A1 | 12/2011 | Ruiz Lopez et al. | |

*Primary Examiner* — Kwang B Yao
*Assistant Examiner* — Nguyen Ngo
(74) *Attorney, Agent, or Firm* — McDermott Will & Emery LLP

(57) ABSTRACT

A network communication structure, system and method are disclosed in the invention. The network communication structure includes client devices, a power line network and access points. One of the access points is connected to an external internet. The access points are all connected in the power line network, such that a first local area network is formed between the access points. Each of the access points utilizes an omni-directional antenna to form a local area sub-network between the access point and a client device. Each of the access points utilizes a directional antenna to form a second local area network between access points. According to a network quality of the power line network, each of the access points transmits an information packet to another access point via the first local area network or the second local area network.

7 Claims, 8 Drawing Sheets

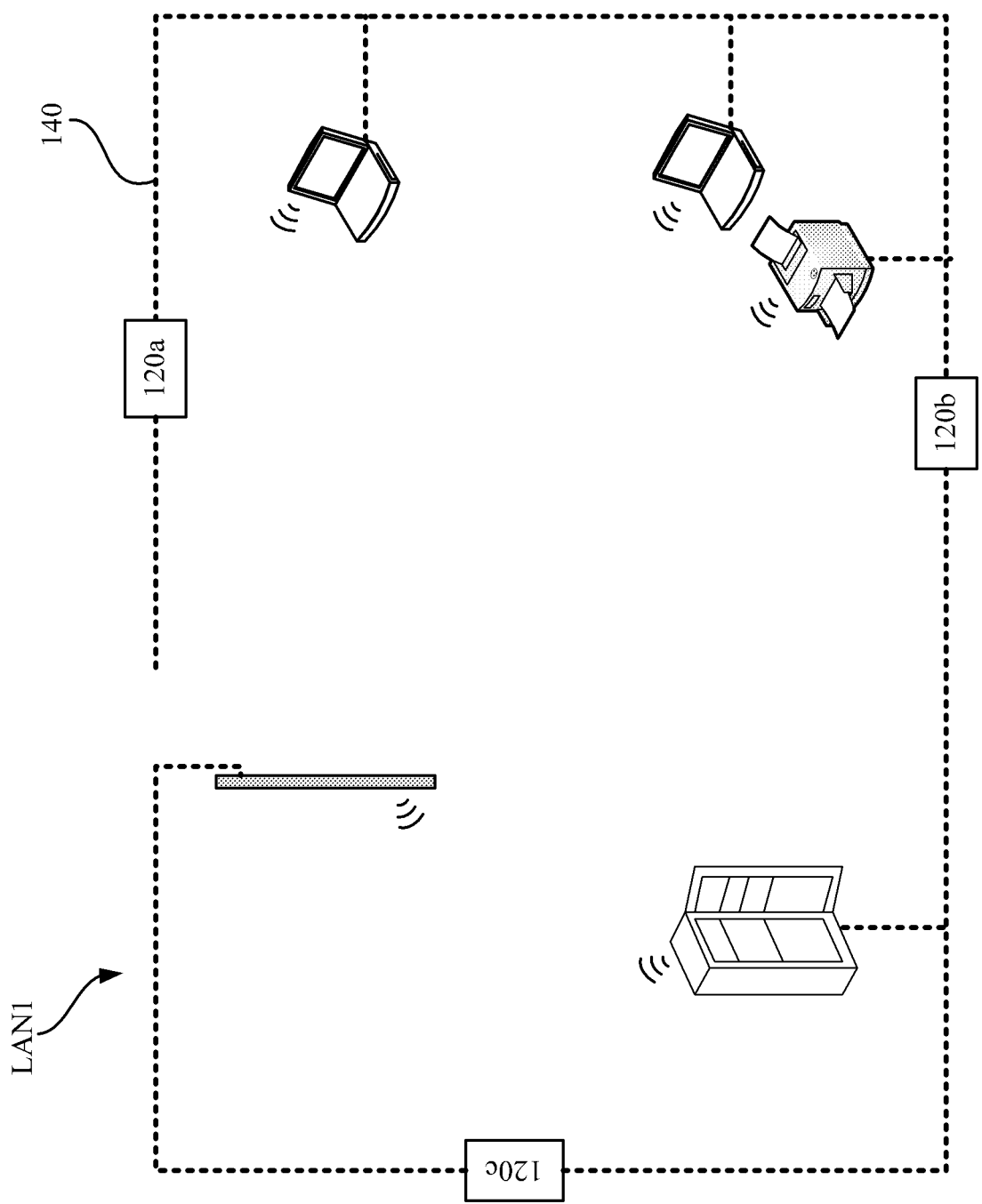

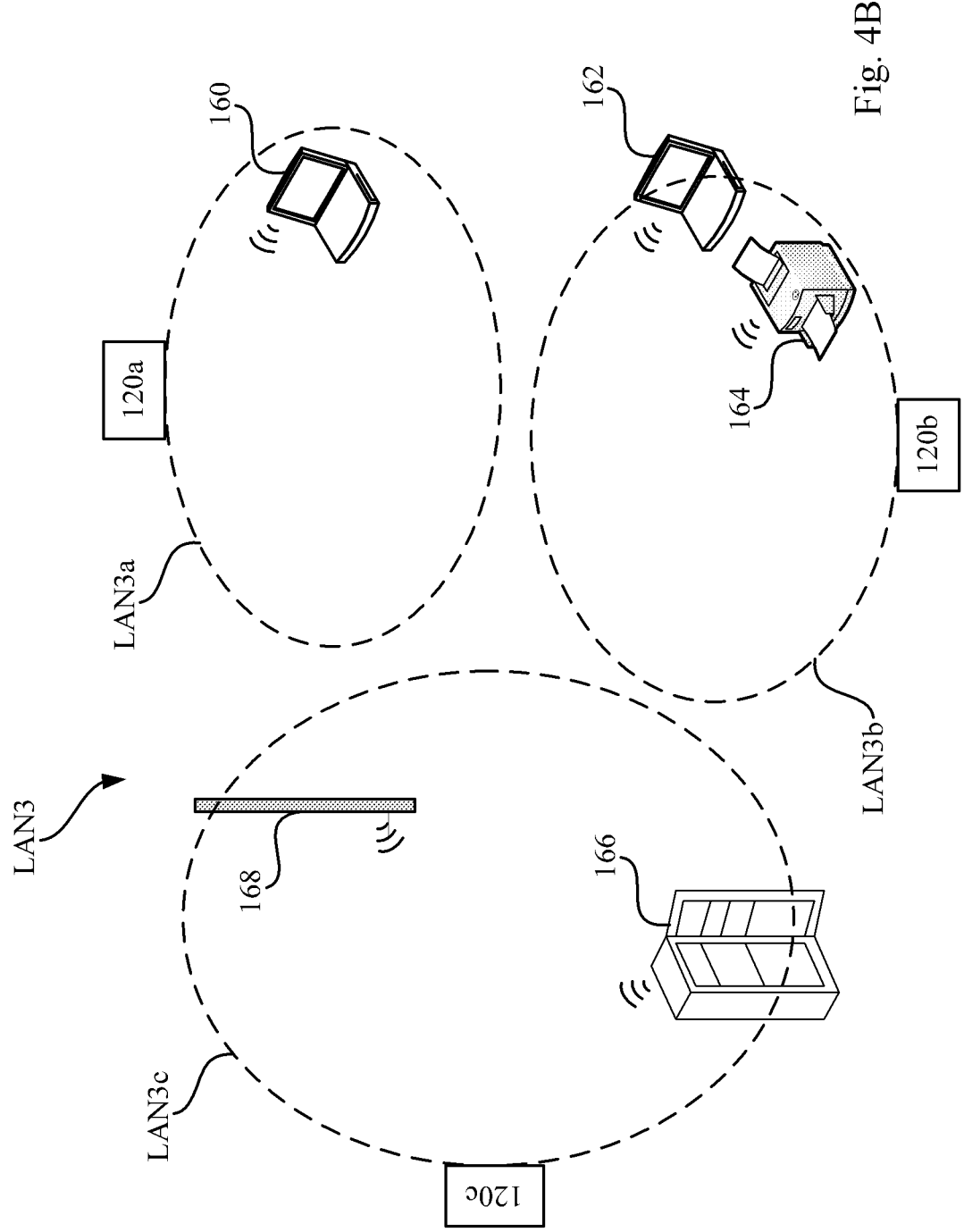

NETWORK COMMUNICATION STRUCTURE, NETWORK COMMUNICATION SYSTEM AND NETWORK COMMUNICATION METHOD

RELATED APPLICATIONS

This application claims priority to Taiwan Application Serial Number 101109883, filed Mar. 22, 2012, which is herein incorporated by reference.

BACKGROUND

1. Field of Invention

The invention relates to a network communication structure. More particularly, the invention relates to a network communication structure integrated with a power line network and a communication method.

2. Description of Related Art

With the rapid development of the electronic communication technology, various digital communication methods via wire or wireless transmission have been developed rapidly. As the main medium for electronic signal transmission, the digital communication methods have been applied in various products, such as a personal computer, a mobile phone, a printer and even a digital household appliance product.

Currently, the digital household appliance product has become a hot topic in these products. In order to realize the real digital control of the household appliance, the household appliance product needs to be able to communicate with a central controller or other electronic devices so as to exchange the current switch status and the operation information.

Generally, a wireless communication protocol (such as a Wifi communication protocol) is used for communication between general computer devices. However, for the household appliance, there is no doubt that power wiring is the most popular transmission line. Therefore, the industry has actively developed various product applications for the power line network such that the household appliance or other electronic devices can be connected to the power line network conveniently as soon as these devices are connected to a power outlet.

However, in practice, although the power line network can reach every corner, its network transmission quality is subject to various factors. For example, when multiple electronic devices use the power line network to transmit data simultaneously, an insufficient bandwidth or a decreased transmission speed may be generated; additionally, if much power is consumed during the operation of a particular electronic device (such as when a the temperature of a refrigerator is fallen or an electromagnetic plate is started), an obvious signal noise interference may be generated at particular nodes of a power line, and thus the communication quality is degraded or even the communication is interrupted.

SUMMARY

In order to solve the above-mentioned problems, the invention provides a network communication structure and network communication method. There are a plurality of access points under this structure. Each access point integrates a connection of a power line network and meanwhile the access point is provided with a first wireless communication module and a second wireless communication module. In some embodiments, the first wireless communication module forms a first local area network between the access points, and the second wireless communication module forms a second local area network between the access points and at least one client device. The access point is a mesh access point with a capability of dynamic routing. According to a communication quality of the power line network, the access point can dynamically select to perform a packet transmission between the access points via the first local area network or the power line network.

Accordingly, an aspect of the invention provides a network communication structure including a plurality of client devices, a power line network and a plurality of access points. One of the access points is connected to an external internet. The plurality of access points are all connected in the power line network such that a first local area network is formed between the access points. Each access point includes a first wireless communication module and a second wireless communication module. The first wireless communication module includes an omni-directional antenna. The first wireless communication module is used to wirelessly connect with the client devices in a communication scope of the omni-directional antenna so as to form a local area sub-network between one of the access points and at least one of the client devices. The second wireless communication module includes at least one directional antenna. The second wireless communication module is used to wirelessly connect with at least one of the other access points so as to form a second local area network between the access points. According to a network quality of the power line network, each access point selectively transmits an information packet to another access point via the first local area network or the second local area network.

According to an embodiment of the invention, each of the plurality of access points is a mesh access point with a capability of dynamic routing and integrated with a power line communication unit of the power line network.

According to another embodiment of the invention, the first wireless communication module and the second wireless communication module use different frequency bands. In this embodiment, the first wireless communication module can use a frequency band of 2.4 GHz and the second wireless communication module can use a frequency band of 5 GHz.

Another aspect of the invention provides a network communication system formed by the above-mentioned access points.

Still another aspect of the invention provides a network communication method which is applicable between a plurality of access points. One of the plurality of access points is connected to an external internet. The plurality access points form a first local area network via a power line network. The plurality of access points are wirelessly connected with each other to form a second local area network. Each access point is wirelessly connected to at least one of the adjacent client devices to form a local area sub-network. When any one of the access points receives an information packet, the network communication method includes: determining whether a target device of the information packet is directed to the access point, and if so, processing the information packet with the access point; determining whether the information packet comes from the external internet if the above-mentioned result is that the target device of the information packet is not directed to the access point; determining whether the target device of the information packet is directed to a client device in the local area sub-network of the access point if the above-mentioned result is that the information packet comes from the external internet, and transmitting the information packet to the client device via the local area sub-network if the above-mentioned result is that the target device of the information packet is not directed to the local area sub-network;

and determining a network quality of the power line network if the above-mentioned result is that the target device of the information packet is not directed to the local area sub-network, and selectively transmitting the information packet to another access point via the first local area network or the second local area network according to the network quality.

According to still another embodiment of the invention, the step of determining the network quality of the power line network includes: detecting an overall transmission speed of the power line network; transmitting the information packet to another access point via the first local area network if the overall transmission speed is greater than a reference speed; and transmitting the information packet to another access point via the second local area network if the overall transmission speed does not reach the reference speed.

According to yet still another embodiment of the invention, when the access point receives the information packet, the network communication method further includes: determining whether the target device of the information packet is directed to these access points or all of the client devices corresponding to these access points; and abandoning the information packet if the target device of the information packet is not directed to any one of these access points or any one of these client devices.

According to an embodiment of the invention, when it is determined that the information packet does not come from the external internet, the network communication method further includes: determining whether the information packet comes from the power line network; transmitting the information packet to the external internet if the information packet comes from the power line network; and performing a transmission process for the information packet if the information packet does not come from the power line network.

According to another embodiment of the invention, when any one of the access points is intended to transmit an information packet, the network communication method further includes: determining whether a target device of the information packet is directed to a client device in the local area sub-network of the access point, and if so, transmitting the information packet to the client device via the local area sub-network; determining whether the information packet is directed to the external internet if the above-mentioned result is that the target device of the information packet is not directed to the local area sub-network; determining whether the access point is connected to the external internet if the above-mentioned result is that the information packet is directed to the external internet, and if so, transmitting the information packet to the external internet; and determining a network quality of the power line network if the above-mentioned result is that the access point is not connected to the external internet, and selectively transmitting the information packet to another access point via the first local area network or the second local area network according to the network quality.

According to still another embodiment of the invention, if the information packet is neither directed to the local area sub-network nor the external internet, the network communication method includes: transmitting the information packet to another access point via the second local area network.

BRIEF DESCRIPTION OF THE DRAWINGS

In order to make the foregoing as well as other aspects, features, advantages, and embodiments of the invention more apparent, the accompanying drawings are described as follows:

FIG. 4A illustrates a schematic view of a first local area network formed between the access points based on the power line network of the embodiment in FIG. 1;

FIG. 4B illustrates a schematic view of a local area sub-network formed between the access points and the client devices based on a first wireless communication module;

DETAILED DESCRIPTION

The spirit of the invention is disclosed below with reference to the drawings and detailed description. After learning the embodiments of the invention, those of skills in the art can make modifications and variations based on the technology taught in the invention, without departing from the spirit and scope of the invention.

Figure 1:
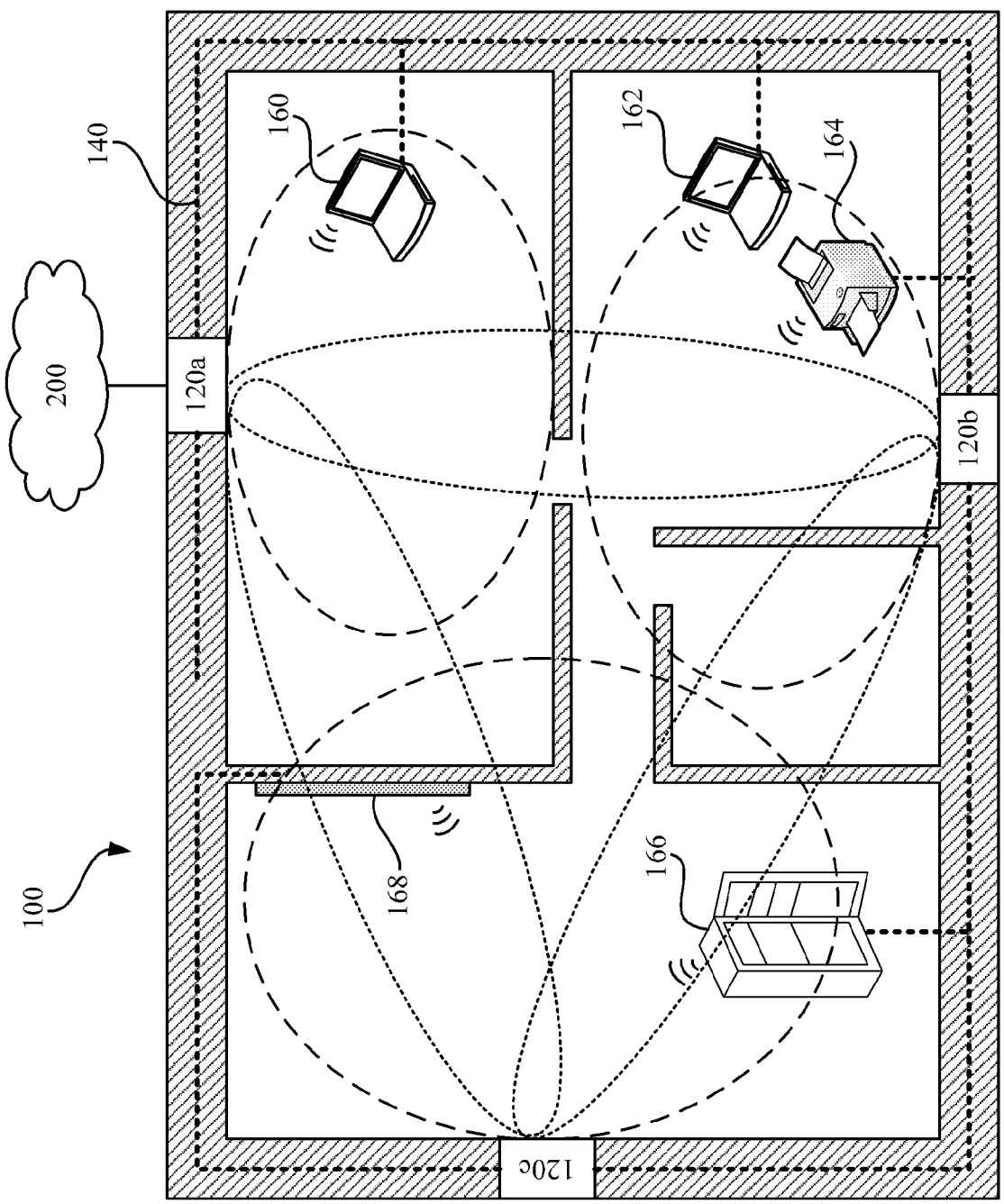
FIG. 1 illustrates a schematic view of a network communication structure according to an embodiment of the invention.

Referring to FIG. 1, it illustrates a schematic view of a network communication structure 100 according to an embodiment of the invention. As shown in FIG. 1, the network communication structure 100 includes a plurality of access points (in this embodiment, they are access points 120a, 120b, and 120c), a power line network 140 and a plurality of client devices (in this embodiment, they are client devices 160, 162, 164, 166 and 168). In this embodiment, the client devices 160, 162, 164, 166 and 168 can be classified into electronic products such as a personal computer, another personal computer, a printer, a refrigerator, and a TV, but the invention is not limited to this classification. In practice, the client devices of this embodiment can be various electronic devices which are connected to the power line network 140 and/or which have a function of wireless network connection.

At least one of the access points 120a, 120b, and 120c is connected to an external internet 200, and access point 120a is connected to the external internet 200 in this embodiment. The access point 120a can function as a gateway between an internal local area network and the external internet 200.

Figure 2:
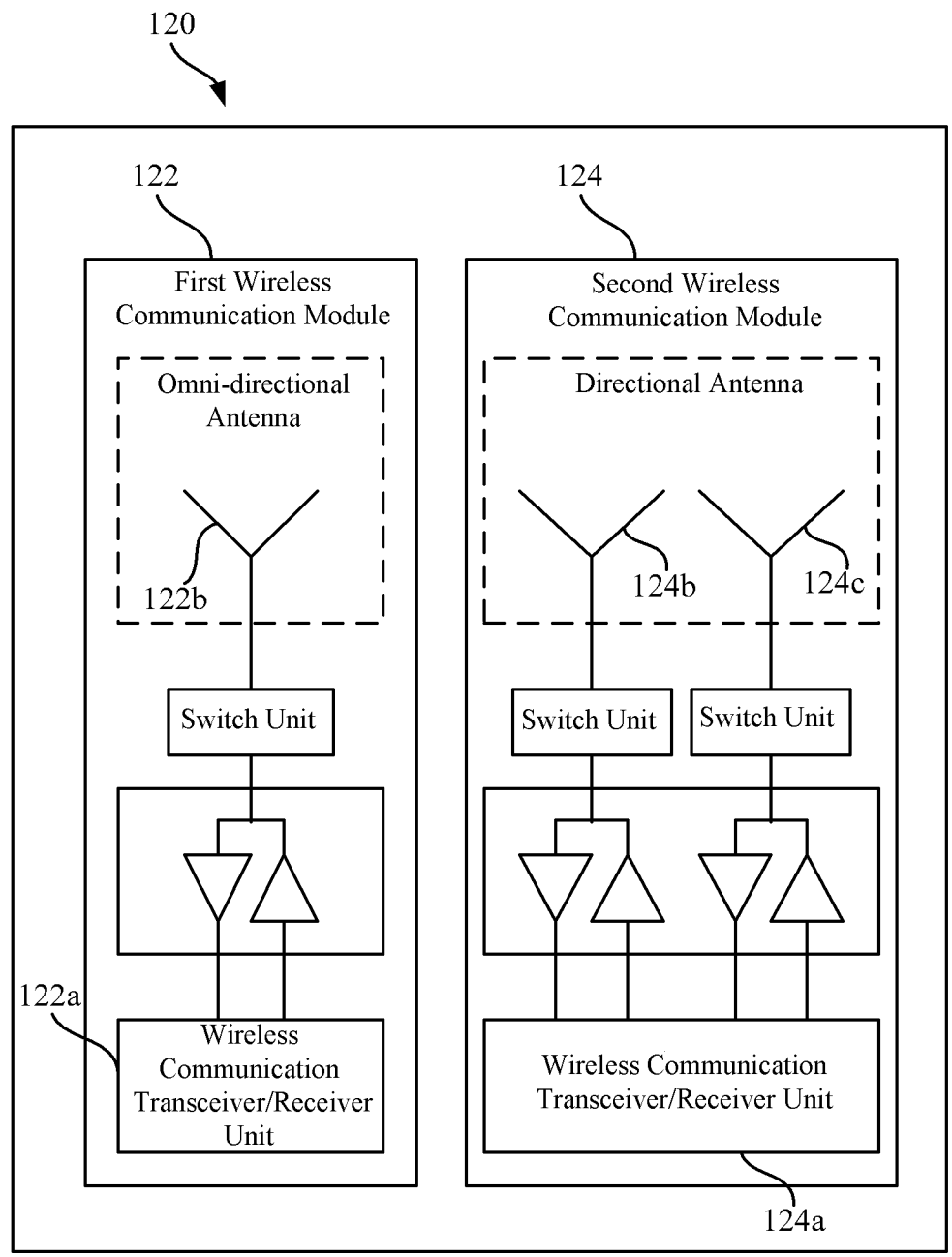
FIG. 2 illustrates a function block diagram of access points according to an embodiment of the invention.

Referring to FIG. 2 and FIGS. 3A to 3D together for the internal structures of the access points 120a, 120b, and 120c, FIG. 2 illustrates a function block diagram of the access point 120 according to an embodiment of the invention. It should be illustrated that the access point 120 illustrated in FIG. 2 is approximately applicable to any one of the access points 120a, 120b, and 120c in FIG. 1.

The access points 120a, 120b, and 120c are all arranged in the power line network 140. Each of the access points 120a, 120b, and 120c is a mesh access point with a capability of dynamic routing and integrated with a power line communication (PLC) unit of the power line network 140.

Figure 3A:
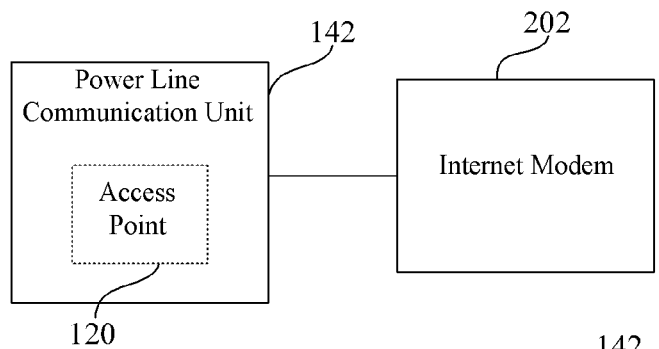
FIGS. 3A-3D illustrates schematic views of various integration methods between an access point and a power line communication unit of a power line network according to various embodiments of the invention.
Figure 3B:
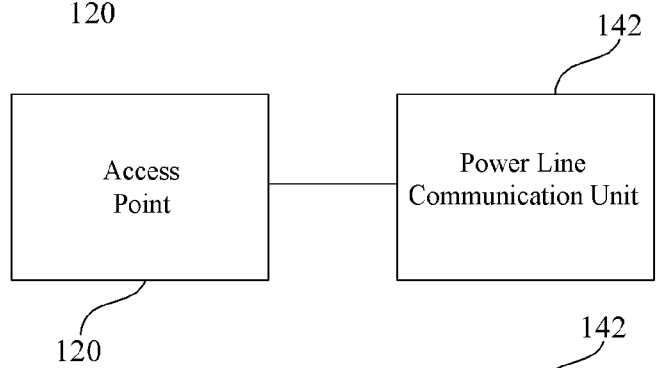
Figure 3C:
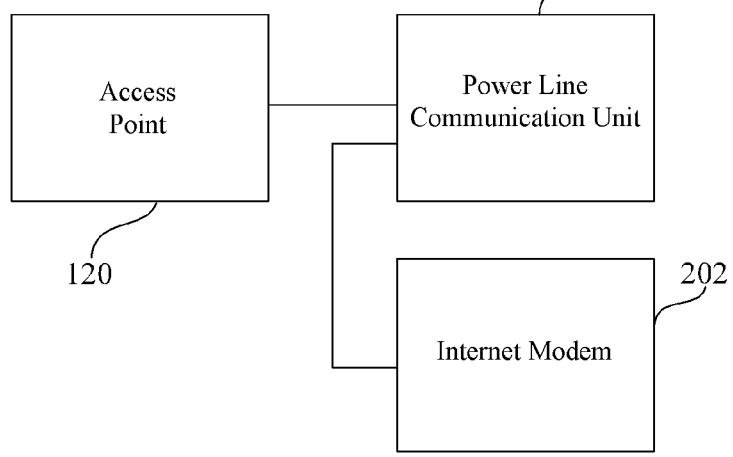
Figure 3D:
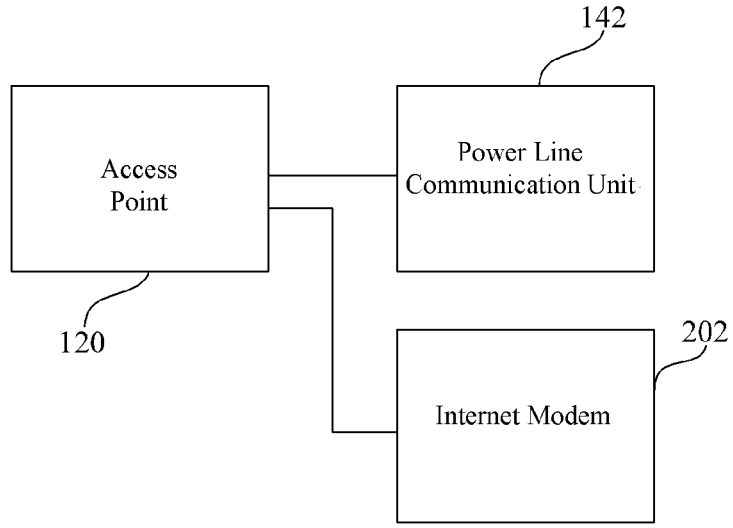

FIGS. 3A to 3D illustrate schematic views of various integration methods between the access point 120 and a PLC unit 142 of the power line network 140 according to various embodiments of the invention. As shown in FIG. 3A, the access point 120 can be directly integrated into the PLC unit 142. When the function of the access point 120 is integrated into the PLC unit 142, the PLC unit 142 can be further connected to an internet modem 202 (e.g., an asymmetrical digital subscriber loop (ADSL) modem). Alternatively, as shown in FIG. 3B to 3D, the access point 120 is electrically connected to the PLC unit 142 and electrically connected to the internet modem 202 in a direct or indirect way.

The access points 120a, 120b, and 120c are all arranged in the power line network 140 such that a first local area network is formed between the access points 120a, 120b, and 120c. Referring to FIG. 4A at the same time, it illustrates a schematic view of a first local area network LAN1 formed between the access points 120a, 120b, and 120c based on the power line network 140 in the embodiment in FIG. 1.

As shown in FIG. 2, each access point 120 includes a first wireless communication module 122 and a second wireless communication module 124. In this embodiment, the first wireless communication module 122 includes a wireless communication transceiver/receiver unit 122a and an omni-directional antenna 122b, but the invention is not limited to this. Additionally, the first wireless communication module 122 can further include a rectification unit and a switch unit which are arranged between the wireless communication transceiver/receiver unit 122a and the omni-directional antenna 122b.

The first wireless communication module 122 is used to wirelessly connect with the client devices (160-168) in a communication scope of the omni-directional antenna 122b so as to form a local area sub-network between the access points (120a-120c) and the client devices (160-168). Referring to FIG. 4B at the same time, it illustrates a schematic view of a local area sub-network LAN3 formed between the access points (120a-120c) and the client devices (160-168) based on the first wireless communication module 122. As shown in FIG. 4B, the access points 120a, 120b, and 120c respectively form the local area sub-networks LAN3a, LAN3b and LAN3c (generally referred to as the local area sub-network LAN3) based on respective omni-directional antennas 122b thereof. However, the local area sub-networks LAN3a, LAN3b and LAN3c are basically independent.

The local area sub-network LAN3a formed by the access point 120a covers the client device 160. The local area sub-network LAN3b formed by the access point 120b covers the client devices 162 and 164. The local area sub-network LAN3c formed by the access point 120c covers the client devices 166 and 168.

Figure 4C:
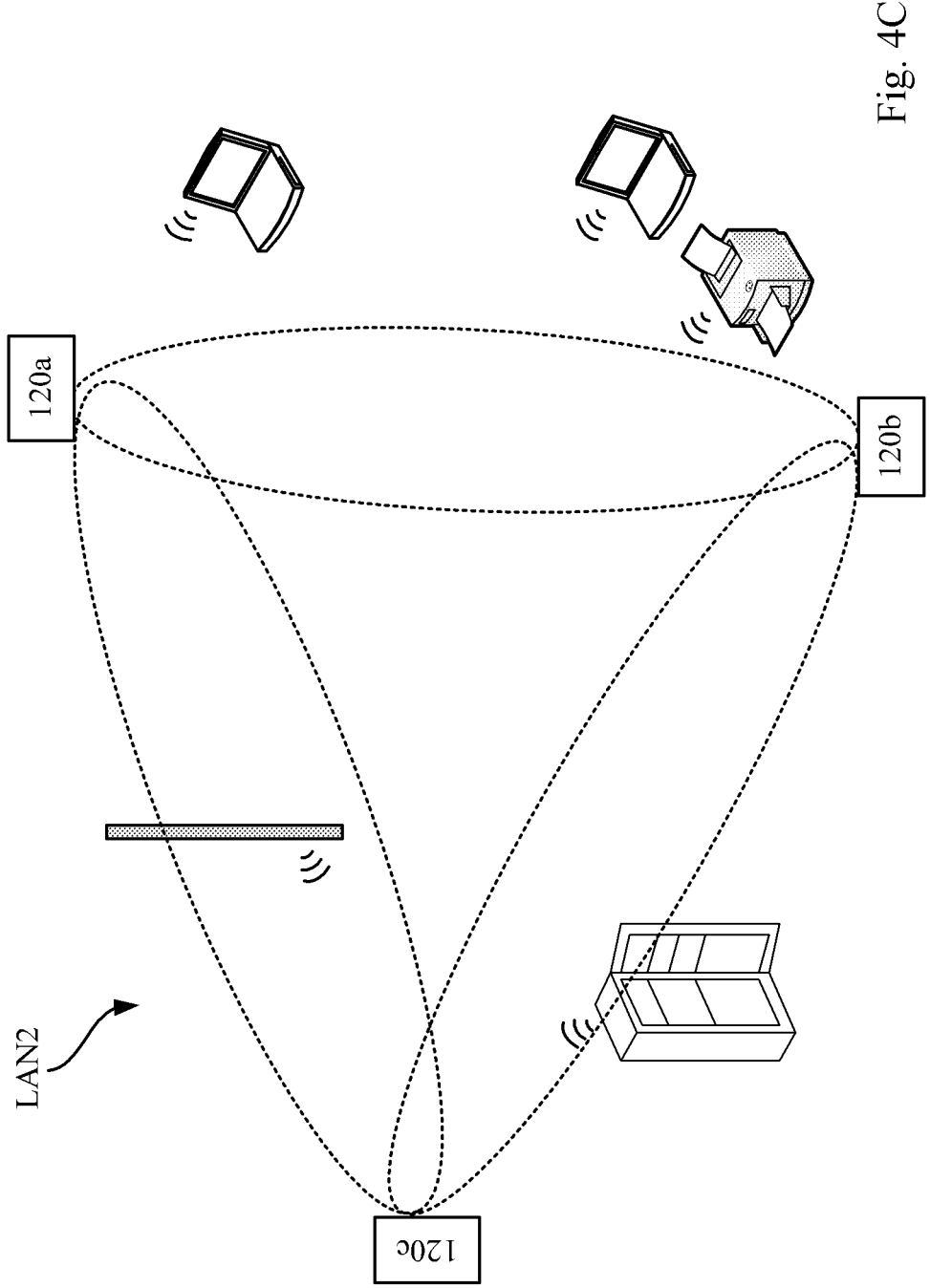
FIG. 4C illustrates a schematic view of a second local area network formed between the access points and the client devices based on a second wireless communication module.

As shown in FIG. 2, the second wireless communication module 124 includes a wireless communication transceiver/receiver unit 124a and at least one directional antenna (in this embodiment, they are two directional antennas 124b and 124c). The second wireless communication module 124 is used to wirelessly connect with at least one of the other access points (e.g., two adjacent access points) so as to form a second local area network between the access points 120a-120c. Referring to FIG. 4C at the same time, it illustrates a schematic view of a second local area network LAN2 formed between the access points (120a-120c) and the client devices (160-168) based on the second wireless communication module 124. In this embodiment, the first wireless communication module 122 and the second wireless communication module 124 use different frequency bands. For example, the first wireless communication module 122 may use a frequency band of 2.4 GHz, and the second wireless communication module 124 may use a frequency band of 5 GHz. Therefore, a mutual interference between the local area sub-network LAN3 and the second local area network LAN2 can be avoided and both of them can have a wider network bandwidth and a higher transmission speed.

In the above-mentioned embodiments, the network communication structure 100 includes three groups of access points 120 (120a, 120b, or 120c), but the invention is not limited to this. In the practical application, the network communication structure 100 may include two groups, three groups or more groups of access points 120 for the same effect.

Additionally, another scope of the invention is a network communication system formed by the plurality of access points 120 in the above-mentioned embodiments.

It should be further illustrated that each access point 120 (120a, 120b, or 120c) can selectively transmit an information packet to another access point via the first local area network LAN1 or the second local area network LAN2 according to a network quality of the power line network 140. In regard to the method for receiving and transmitting a packet between the above-mentioned access points 120, the invention further provides a network communication method. This network communication method can be cooperated with the network communication structure 100 of the above-mentioned embodiments. This network communication method will be described in details below.

Figure 5:
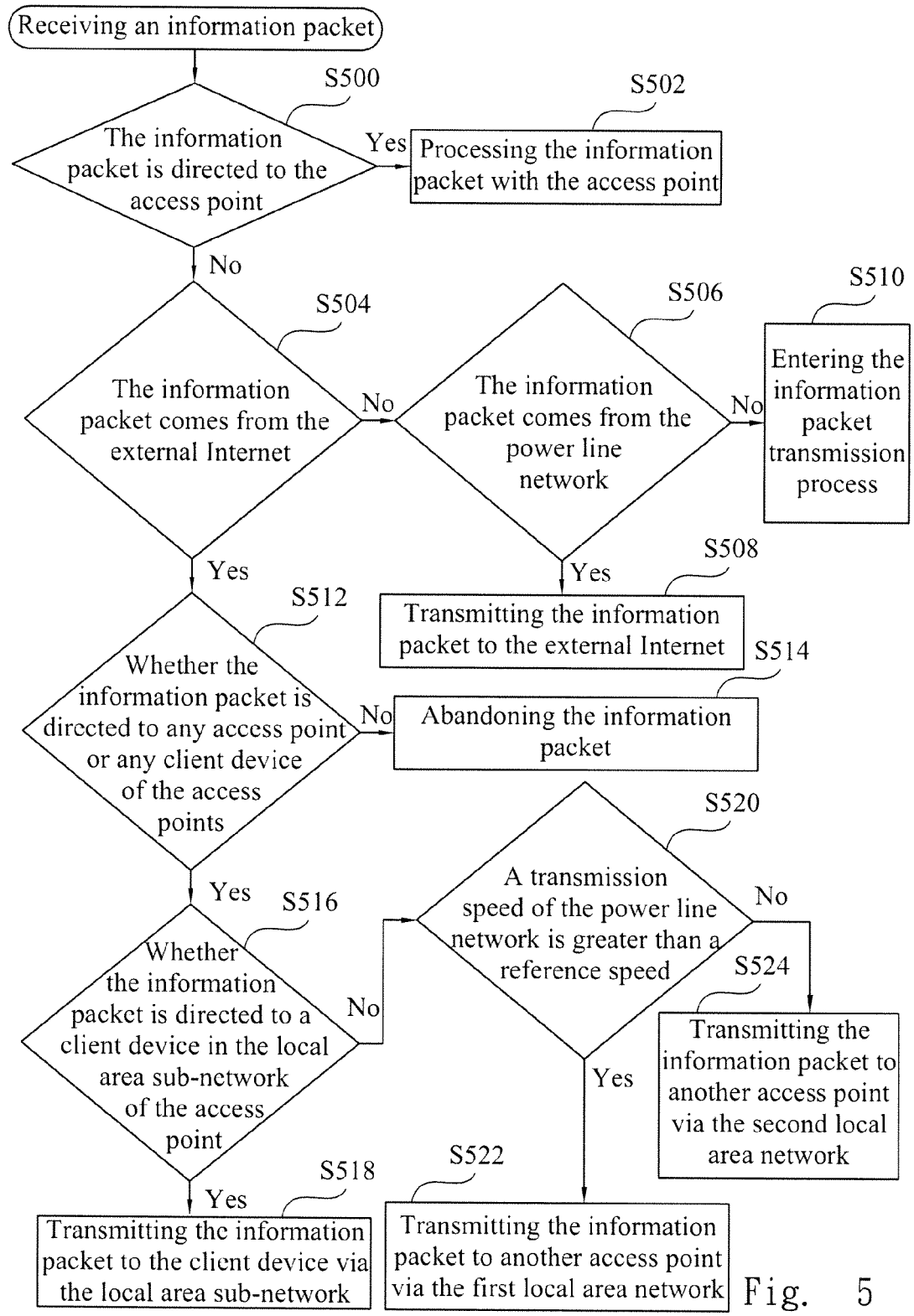
FIG. 5 illustrates a flow chart of a network communication method which is used when any access point receives an information packet in the above-mentioned embodiments.
Figure 6:
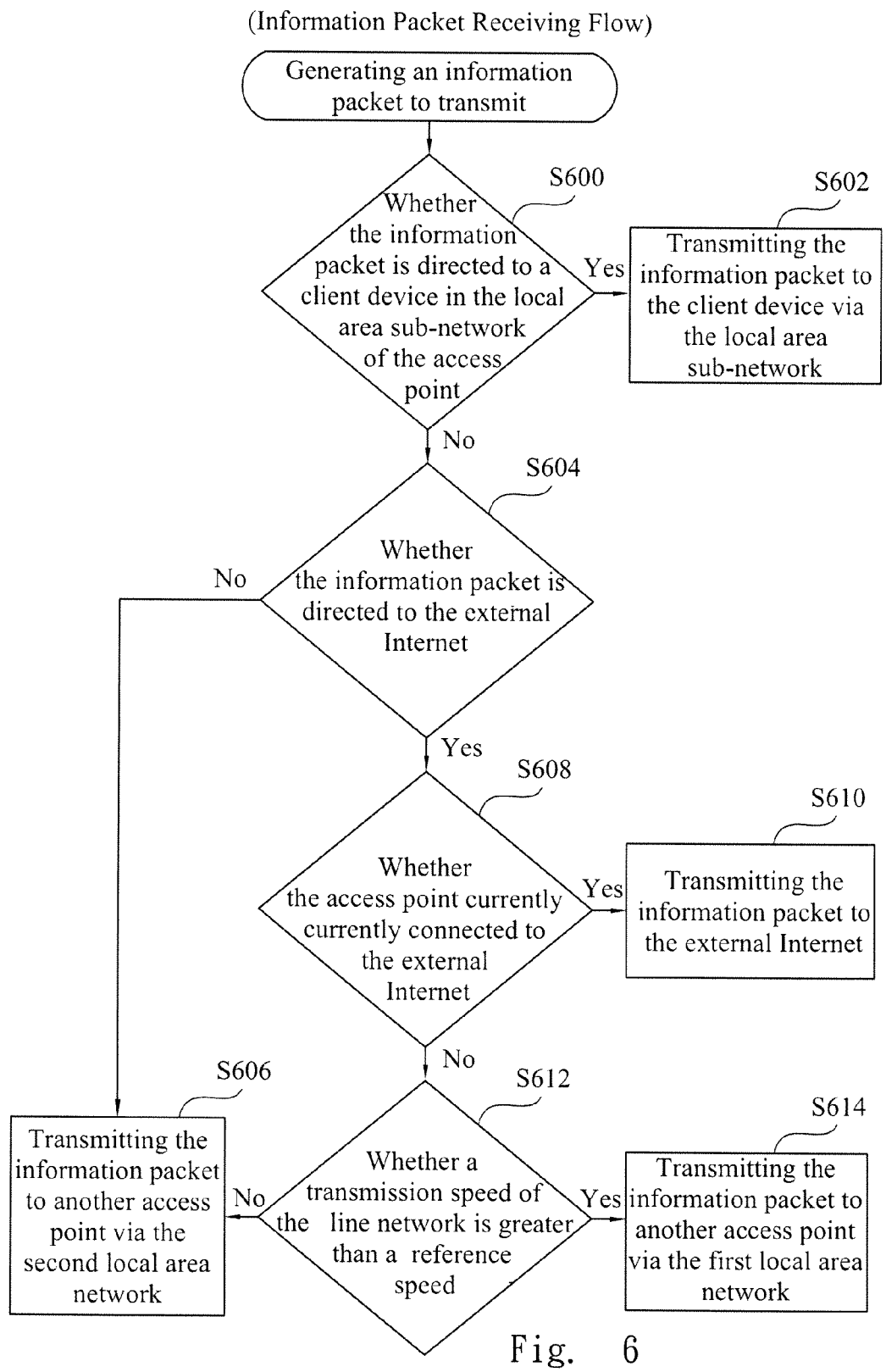
FIG. 6 illustrates a flow chart of a network communication method which is used when any access point is intended to transmit an information packet in the above-mentioned embodiments.

Referring to both FIGS. 5 and 6, FIG. 5 illustrates a flow chart of a network communication method which is used when any access point 120 (120a, 120b, or 120c) in the above-mentioned embodiments receives an information packet; FIG. 6 illustrates a flow chart of a network communication method which is used when any access point 120 (120a, 120b, or 120c) in the above-mentioned embodiments is intended to transmit an information packet.

In the flow of receiving an information packet as shown in FIG. 5, after any access point 120 receives an information packet, step S500 is performed first, determining whether a target device of the information packet is directed to the access point. If so, then step S502 is performed, processing the information packet with the access point 120, e.g., reading the content of the information packet and performing a related setting or operation, e.g., updating the setting or a network address reference table in the access point 120.

If the target device of the information packet is not directed to the access point 120 in step S500, then step S504 is performed, determining whether the information packet comes from the external internet 200.

If it is determined that the information packet does not come from the external internet 200 in step S504, step S506 is performed, determining whether the information packet comes from the power line network 140. If it is determined that the information packet comes from the power line network 140 in step S506, then step S508 is performed, transmitting the information packet to the external internet 200. On the other hand, if it is determined that the information packet does not come from the power line network 140 in step S506, then a transmission process is performed for the information packet, i.e., step S510 is performed. The details of the transmission process in step S510 will be illustrated in the following paragraphs and in the flow of transmitting an information packet in FIG. 6.

If the result of step S504 is that the information packet comes from the external internet 200, then step S512 is performed, determining whether the target device of the information packet is directed to any one of all the client devices (160-168) corresponding to all access points (120a, 120b, and 120c) or any access point (120a, 120b, or 120c). If it is determined that the target device of the information packet is not directed to any one of these client devices 160-168 or any one of the access points 120a-120c in step S512, it indicates that this information packet may be a spam packet or a malicious packet which is irrelevant to the network communication structure 100, then step S514 is performed, abandoning the information packet.

If it is determined that the target device of the information packet is directed to any one of the client devices 160-168 or any one of the access points 120a-120c in the internal network scope of the network communication structure 100 in step S512, then step S516 is performed, determining whether the target device of the information packet is directed to the client device in the local area sub-network LAN3 of the access point 120. Referring to FIG. 4B at the same time, taking the access point 120a as an example, it is determined whether the target device of the information packet is directed to the client device 160 in the local area sub-network LAN3a of the access point 120a; taking the access point 120b as an example, it is determined whether the target device of the information packet is directed to the client devices 162 and 164 in the local area sub-network LAN3b of the access point 120b. The rest can be deduced from this.

If it is determined in step S516 that the target device of the information packet is directed to the client device in the local area sub-network LAN3 of the access point 120, then step S518 is performed, transmitting the information packet to the client device via the local area sub-network LAN3.

If it is determined that the target device of the information packet is not directed to the local area sub-network in step S516, then steps S520-S524 are further performed so as to determine a network quality of the power line network 140 and selectively transmit the information packet to another access point via the first local area network LAN1 or the second local area network LAN2 according to the network quality of the power line network 140.

In this embodiment, an overall transmission speed of the power line network 140 can be detected and whether the overall transmission speed of the power line network 140 (the first local area network LAN1) is greater than a reference speed can be determined in step S520. For example, the determining standard can be that whether the bandwidth is greater than 5 MB/sec.

If the overall transmission speed of the power line network 140 is greater than the reference speed, then step S522 is performed, transmitting the information packet to another access point via the first local area network LAN1. On the contrary, if not, then step S524 is performed, transmitting the information packet to another access point via the second local area network LAN2.

Then referring to FIG. 6 at the same time, it illustrates a flow used when any access point 120 (120a, 120b, or 120c) is intended to transmit the information packet or in the transmission process in the above-mentioned step S510.

As shown in FIG. 6, when an information packet to be transmitted is generated on any access point 120, for the network communication method, step S600 is performed, determining whether a target device of the information packet is directed to the client device in the local area sub-network LAN3 of the access point 120. If it is determined in step S600 that the target device of the information packet is directed to the client device in the local area sub-network LAN3 of the access point 120, then step S602 is performed, transmitting the information packet to the client device via the local area sub-network LAN3.

If it is determined that the target device of the information packet is not directed to the local area sub-network in step S600, step S604 is performed, determining whether the information packet is directed to the external internet 200.

If the information packet is not directed to the external internet 200 in step S604, step S606 is performed, transmitting the information packet to another access point via the second local area network LAN2.

If the information packet is directed to the external internet 200 in step S604, step S608 is performed, determining whether the access point is currently connected to the external internet 200.

If it is determined in step S608 that the access point is connected to the external internet 200, step S610 is performed, transmitting the information packet to the external internet 200. On the other hand, if it is determined that the access point 120 is not connected to the external internet 200 in step S608, then step S612 is performed, determining whether an overall transmission speed of the power line network 140 is greater than a reference speed (or determining a network quality of the power line network 140) and accordingly transmitting the information packet to another access point selectively via the first local area network or the second local area network.

If the overall transmission speed of the power line network 140 is greater than the reference speed, then step S614 is performed, transmitting the information packet to another access point via the first local area network LAN1. On the contrary, if the overall transmission speed does not reach the reference speed, then step S606 is performed, transmitting the information packet to another access point via the second local area network LAN2.

Compared with the prior art, the invention provides a network communication structure and a network communication method. There are a plurality of access points under this structure. Each access point integrates the connection of the power line network and meanwhile the access point is provided with the first wireless communication module and the second wireless communication module. In some embodiments, the first wireless communication module forms the access points and the first local area network between the access points; the second wireless communication module forms the second local area network between the access points and the client devices. The access point is the mesh access point with the capability of dynamic routing. According to the communication quality of the power line network, the access point can dynamically select to perform a packet transmission between the access points via the first local area network or the power line network.

Although the invention has been disclosed with reference to several embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A network communication method, applicable between a plurality of access points, wherein one of the access points is connected to an external interne, the plurality of access points form a first local area network via a power line network, the plurality of access points are wirelessly connected with each other so as to form a second local area network, each access point is wirelessly connected to at least one of the adjacent client devices so as to form a local area sub-network; when any one of the access points receives an information packet, the network communication method comprises:

determining whether a target device of the information packet is directed to the access point, and if so, processing the information packet with the access point;

determining whether the information packet comes from the external internet if the above-mentioned result is that the target device of the information packet is not directed to the access point; and determining whether the target device of the information packet is directed to a client device in the local area sub-network of the access point if the above-mentioned result is that the information packet comes from the external internet, and determining a network quality of the power line network if the result is that the target device of the information packet is not directed to the local area sub-network, and selectively transmitting the information packet to another access point via the first local area network or the second local area network according to the network quality.

2. The network communication method of claim 1, wherein the step of determining the network quality of the power line network comprises:

detecting an overall transmission speed of the power line network;

transmitting the information packet to another access point via the first local area network if the overall transmission speed is greater than a reference speed; and transmitting the information packet to another access point via the second local area network if the overall transmission speed does not reach the reference speed.

3. The network communication method of claim 1, wherein when the access point receives the information packet, the network communication method further comprises:

determining whether the target device of the information packet is directed to these access points or all the client devices corresponding to these access points; and abandoning the information packet if the target device of the information packet is not directed to any one of these access points or any one of these client devices.

4. The network communication method of claim 1, wherein when it is determined that the information packet does not come from the external internet, the network communication method further comprises:

determining whether the information packet comes from the power line network;

transmitting the information packet to the external internet if the information packet comes from the power line network; and performing a transmission process for the information packet if the information packet does not come from the power line network.

5. The network communication method of claim 1, wherein when any one of the access points is intended to transmit an information packet, the network communication method further comprises:

determining whether a target device of the information packet is directed to a client device in the local area sub-network of the access point, and if so, transmitting the information packet to the client device via the local area sub-network;

determining whether the information packet is directed to the external internet if the above-mentioned result is that the target device of the information packet is not directed to the local area sub-network;

determining whether the access point is connected to the external internet if the above-mentioned result is that the information packet is directed to the external internet, and if so, transmitting the information packet to the external internet; and determining a network quality of the power line network if the above-mentioned result is that the access point is not connected to the external internet and selectively transmitting the information packet to another access point via the first local area network or the second local area network according to the network quality.

6. The network communication method of claim 5, wherein if the information packet is neither directed to the local area sub-network nor the external internet, the network communication method comprises: transmitting the information packet to another access point via the second local area network.

7. The network communication method of claim 1, wherein if the result of determining whether the target device of the information packet is directed to a client device in the local area sub-network of the access point is that the target device of the information packet is directed to the client device in the local area sub-network of the access point, the network communication method comprises: transmitting the information packet to the client device via the local area sub-network.

* * * * *